(12) United States Patent
Cattanach et al.

(10) Patent No.: US 6,397,216 B1
(45) Date of Patent: May 28, 2002

(54) ORDERING KEYS IN A TABLE USING AN ORDERING MASK

(75) Inventors: John Turnbull Cattanach, Dublin (IR); Kai Chiu Wong, Saratoga, CA (US)

(73) Assignee: Amdahl Corporation, Sunnyvale, CA (US)

( * ) Notice: Subject to any disclaimer, the term of this patent is extended or adjusted under 35 U.S.C. 154(b) by 0 days.

(21) Appl. No.: 09/457,964

(22) Filed: Dec. 9, 1999

(51) Int. Cl.[7] .............................................. G06F 17/30
(52) U.S. Cl. ..................... 707/7; 707/101; 707/104.1; 709/107; 709/315; 709/221; 717/3; 717/5
(58) Field of Search ............................. 707/3, 4, 9, 101, 707/104.1, 7, 102, 205; 709/220, 245

(56) References Cited

U.S. PATENT DOCUMENTS

| | | | | |
|---|---|---|---|---|
| 5,317,739 A | * | 5/1994 | Elko et al. ................... | 395/650 |
| 5,410,695 A | * | 4/1995 | Frey et al. ................... | 395/650 |
| 5,493,668 A | * | 2/1996 | Elko et al. ................... | 395/457 |
| 5,857,196 A | * | 1/1999 | Angle et al. ................. | 707/102 |
| 5,907,842 A | * | 5/1999 | Mennmeier et al. ........... | 707/7 |
| 6,061,679 A | * | 5/2000 | Bournas et al. ................ | 707/3 |

* cited by examiner

*Primary Examiner*—Paul R. Lintz
*Assistant Examiner*—Jacques Veillard
(74) *Attorney, Agent, or Firm*—David E. Lovejoy (57) ABSTRACT

The present invention is a mask ordering method and apparatus which controls the way keys are compared. In its general form, the mask ordering method operates to order (with a less than, greater than or equal to comparison) two N-byte (for example, N=16) keys (Key_1 and Key_2) using an N-bit ordering mask where the N bits in the ordering mask correspond one for one with the N bytes in the keys in the same compare direction (either left-to-right or right-to-left).

23 Claims, 3 Drawing Sheets

ORDERING KEYS IN A TABLE USING AN ORDERING MASK

BACKGROUND OF THE INVENTION

The present invention relates to a mask ordering method which controls the way primary keys are compared and relates to a coupling facility (CF) and the accessing of objects within a coupling facility.

A coupling facility (CF) provides a structured means of connecting multiple central processing complexes (CPCs) to allow efficient interchange of data between multiple physical systems while maintaining coherency of the data across all systems. The coupling facility consists of high-speed inter-system (IS) channels, central processing units (CPUs), random-access memory (AND storage that is accessed by the IS channels and CPUs, and control software running in the CPUs.

A coupling facility structure represents a set of objects maintained on behalf of attaching systems. A structure is similar to a shared file in a direct-access storage device (DASD) except that structures are maintained in the coupling facility's storage. The coupling facility receives commands from attaching CPCs via the IS channels, executes the commands, and returns responses over the IS channels. The commands create, write, read, update, or delete structures on behalf of the attaching CPCs.

In a structure, entries comprise one class of objects that are maintained in storage. Entries may contain name, index, and other values that must be examined and/or updated by the CPU to successfully complete a CF command. The term name in the present specification means the same thing as the term key. The term key is frequently used generically to mean any value for locating an entry in an ordered table. The term name sometimes refers to a key formed of alpha characters, alphanumeric characters or to other limiting characteristics. In coupling facility products and the preset specification, name has no limiting characteristics and is used most generally and interchangeably with key unless the context indicates otherwise.

Coupling facility products from Amdahl Corporation of Sunnyvale, Cailf. and IBM Corporation of Armonk, N.Y., and others have been implemented using S/390-based platforms but coupling facilities can be implemented on any hardware platform. In machines from Amdahl, Amdahl Coupling Control Code (ACCC) is the code that implements the coupling facility functions. In machines from IBM, Coupling Facility Control Code (CFCC) is the code that implements the coupling facility functions.

The S/390 architecture is well-known to represent the foundation for robust, high-performance, high-reliability computing platforms. In IBM-derived publications, such as U.S. Pat. No. 5,537,574 entitled SYSPLEX SHARED DATA COHERENCY METHOD and U.S. Pat. No. 5,317,739 entitled METHOD AND APPARATUS FOR COUPLING DATA PROCESSING SYSTEMS, the coupling facility is referred to as shared cache or shared electronic storage (SES).

A cache structure represents an intermediate level of a three-tiered data hierarchy where the highest level is the local cache copies of data objects within a CPC and the lowest level is copies of data on shared DASD. Application programs that participate in such a data hierarchy can write and read cache entries in a CF cache structure. Each cache entry is identified by a name. The entries are organized in a logical construct referred to as the directory. A command issued to the CF may request processing of one specific entry or a group of related entries.

In cache structures, several cache commands process cache entries having a name that matches the input name under an input name mask. One such a command is the invalidate-name command. (The invalidate-name command is referred to as the IXLCACHE REQUEST=DELETE_NAME request in the OS/390 MVS Programming: Sysplex Services Guide (GC28-1771) from IBM [hereafter Sysplex Services Guide]). In the Sysplex Services Guide, the input name mask is 16 bits and the input name is 16 bytes. The 16 bits correspond one for one with the 16 bytes of the name. The name comparison is successful when all the name bytes having a corresponding name mask bit of one, are equal. A mask of all zeros causes all names to be processed. A mask of all ones identifies a single name to be processed. Processing, in the case of the invalidate-name command, for example, can range from updating the cache entry to deleting the entry, depending on the values of the other input parameters.

An example that illustrates the naming and masking concepts is given where, for purposes of the example, keys are 4-character names consisting of only the alphabet letters A and B. Assume a cache structure has the following set of name entries:

AABA, ABAA, ABAB, BAAA, BABA, BBAB.

For the above set of name entries, an invalidate-name command specifying an input name AAAA and an input mask of b'0100' invalidates the following entries:

AABA, BAAA and BABA.

For good performance, the utilization of the cache structure requires that an entry corresponding to a specified name be quickly located. Different methods for quickly locating names have been used and proposed. For IBM systems, directories in the form of hash tables have been employed and for Amdahl systems, directories in the form of binary trees have been employed.

For operations of coupling facilities in systems prior to IBM CFLEVEL=7, when the name mask is not all ones, all entries in the cache structure directory have to be scanned to find all the names matching the specified name mask. In cases where the set of entries which match the specified name mask is small compared to the total number of entries in the structure, this scanning process is inefficient and time-consuming.

Some applications on CPCs use invalidate-name with a name mask to perform selective deletion of entries from the cache when, for example, a particular data set is closed, shut down, or ceases to have a shared interest that requires its data to reside in the cache. In these cases, a known naming convention defines the name mask which is used to select the entries to be deleted. In such cases, the full directory scan performed by the invalidate-namne operation adversely impacts the performance of the applications which are using it to perform cleanup.

For operations using IBM CF-Level 7 Improvements (CFLEVEL=7 and higher), a cache structure supports 'name classes' for names adhering to a naming convention defined when the structure is created (via the name class mask). Specifically, names that are identical in byte positions corresponding to bits which are on in the name class mask belong to the same name class. In the IBM implementation, name class queues are used to group together all entries that are processed as a group given the defined naming convention. Later, when an invalidate-name command is requested using a name mask equal to the name class mask for the structure, all of the entries to be deleted can be located efficiently by running through the name class queue, avoiding the overhead of scanning through all of the entries in the structure. The efficiency of application processes that invoke invalidate-name for cleanup purposes is therefore improved. Examples of name classes can be found in the section "Using Name Classes in a Coupling Facility" in the Sysplex Services Guide.

Again, consider the following set of name entries:

AABA, ABAA, ABAB, BAAA, BABA, BBAB.

For that set of name entries and with a name class mask of '0110' specified at structure creation time, the following name classes and members are created where underscores indicate name bytes that identify the name class:

Name class AA: B<u>AA</u>A

Name class AB: A<u>AB</u>A, B<u>AB</u>A

Name class BA: A<u>BA</u>A, A<u>BA</u>B, B<u>BA</u>B

Name class BB: (empty)

In the IBM CFLEVEL=7 implementation, two programming constructs are used for performance enhancement, one for quickly locating a single cache entry by name and another one for locating entries in a specified name class. For locating a single entry by name, a hash table construct is used as described in the section "Hash Accessing of SES Directory Entries" in U.S. Pat. No. 5,537,574. For locating entries in a name class, name class queues are used; however, enhanced efficiency is provided only when the specified name mask is identical to the name class mask (specified when the structure is allocated). When the specified name mask is not identical to the name class mask, the IBM CFCC resorts to scanning the entire cache directory.

While a separate construct, such as name class queues can be employed, there is a need for improvements which support name classes without the additional processing and storage overhead of maintaining separate name class queues and without adverse impact on established methods for quickly finding names.

SUMMARY

The present invention is a mask ordering method and apparatus which controls the way keys are compared. In its general form, the mask ordering method operates to order (with a less than, greater than or equal to comparison) two N-byte (for example, N=16) keys (Name_1 and Name_2) using an N-bit ordering mask where the N bits in the ordering mask correspond one for one with the N bytes in the keys in the same compare direction (either left-to-right or right-to-left). The mask ordering method operates as follows:

A comparison of the two N-byte keys, Name_1 and Name_2, proceeds in a compare direction byte by byte, first for those bytes where the corresponding mask bit is on, and then for those bytes where the corresponding mask bit is off. This byte-position order in which the bytes are compared is hereafter referred to as the compare order.

The byte-by-byte processing continues in the compare order by comparing each corresponding byte in Key_1 and Key_2 until the order of Key_1 relative to Key_2 is determined.

When applying the mask ordering method to organize name classes in a coupling facility (CF) cache structure, each 16-byte cache entry name is an N-bit key (with N=16); the 16-bit name class mask fixed at the creation of the cache structure is an N-bit ordering mask (with N=16). The CF command architecture dictates that the compare direction be left-to-right.

By ordering all cache name entries using the mask ordering method, those entries belonging to the same name class fall into contiguous positions. Furthermore, within a name class, entries are ordered by those name bytes corresponding to name-class-mask bits that are zeros. Name classes are ordered by those name bytes corresponding to name-class-mask bits that are ones.

An embodiment of the invention is particularly useful in a coupling facility (CF) cache structure where operations on names and name classes in a directory, such as the invalidate name command, are performed.

The present invention uses the same programming construct to locate a single cache entry and a specified name class of entries efficiently and without resorting to scanning the entire cache directory.

The present invention does not reduce the speed of searching, inserting and deleting single cache entries while still being able to operate on both single entries and classes of entries.

The present invention minimizes the need for storage overhead as is required for name class queues while being easily integrated into existing systems.

The present invention allows the identification of groups of entries which are particular subsets or supersets of a name class, and provides an efficient method for their retrieval.

The foregoing and other objects, features and advantages of the invention will be apparent from the following detailed description in conjunction with the drawings.

DETAILED DESCRIPTION

Figure 1:
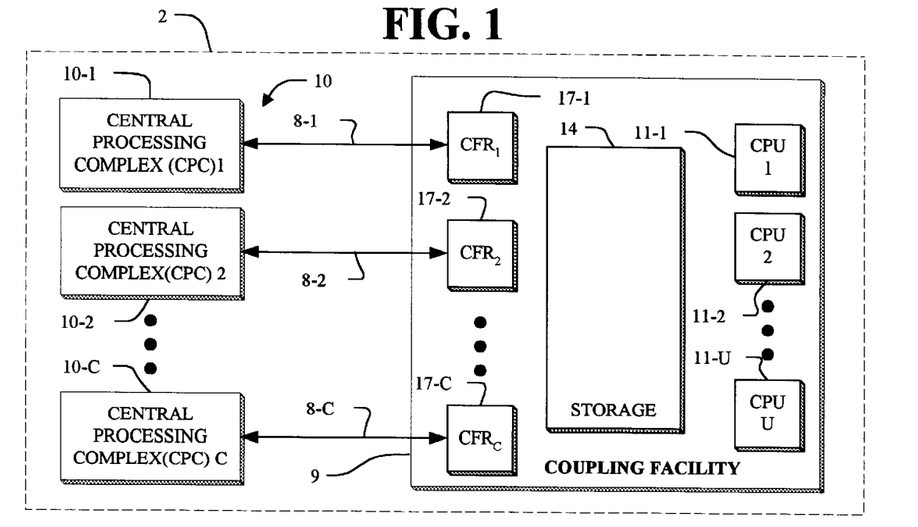
FIG. 1 depicts a block diagram representation of a system including central processing complexes (CPCs) interconnected using a coupling facility (CF).

Overall System—FIG. 1

In FIG. 1, the system 2 includes central processing complexes (CPCs) 10 interconnected to a coupling facility 9 through inter-system (IS) channels 8. The central processing complexes 10 include, for example, the complexes 10-1, 10-2, . . . , 10-C which in turn connect over the IS channels 8-1, 8-2, . . . , 8-C, respectively, to the coupling facility 9. In a typical embodiment, each of the central processing complexes 10-1, 10-2, . . . , 10-C is a computer system operating according to the S/390 architecture of IBM Corporation. In general, computers of any architecture having IS channels can be used for the central processing complexes 10. Each of the complexes 10 operates to execute one or more processes that may share data with other ones of the one or more processes. The sharing of data by two or more processes is carried out through operation of the coupling facility 9.

The coupling facility 9 includes one or more central processing units (CPUs) 11 including CPUs 11-1, 11-2, . . . , 11-U. The coupling facility 9 includes coupling facility receivers (CFRs) 17, including receivers 17-1, 17-2, . . . , 17-C, that connect to the IS channels 8, including channels 8-1, 8-2, . . . , 8-C, respectively, and includes storage 14.

Figure 2:
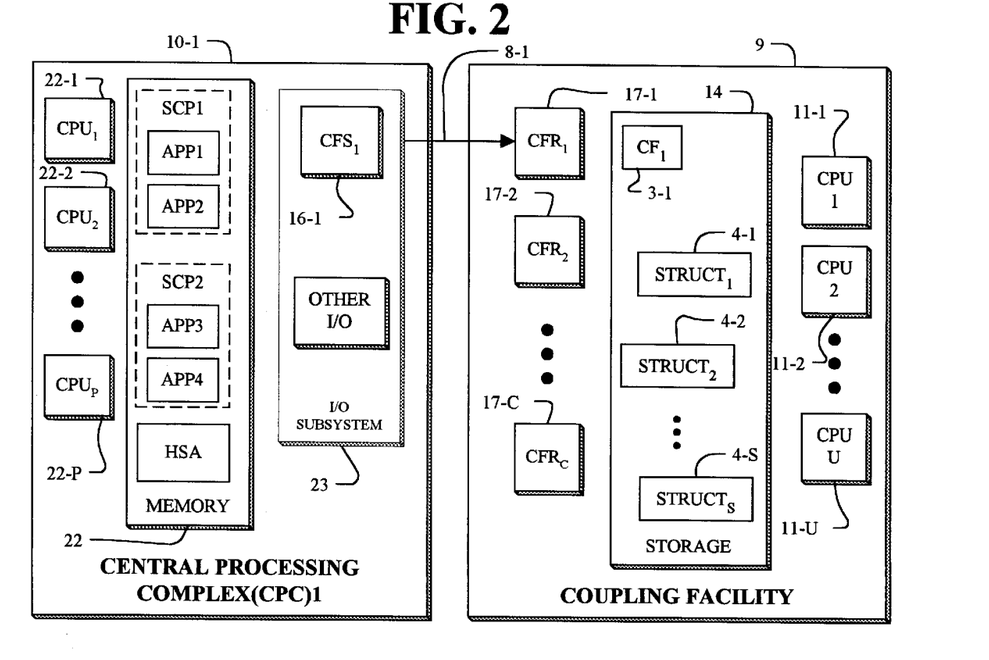
FIG. 2 depicts further details of a typical one of the central processing complexes (CPCs) of FIG. 1 connected to the coupling facility of FIG. 1.

CPC/CFC Interconnection—FIG. 2

In FIG. 2, the central processing complex (CPC) 10-1 of FIG. 1 is shown as typical of CPCs 10 of FIG. 1 and interconnects to the coupling facility 9 through inter-system (IS) channel 8-1. The CPC 10-1 includes CPUs 22-1, 22-2, . . . , 22-P, includes memory 22 and input/output (I/O) subsystem 23. The memory 22 includes system control program SCP1 that has application programs APP1 and APP2, includes system control program SCP2 that has application programs APP3 and APP4 and includes a hardware storage area (HSA). The I/O subsystem 23 includes a coupling facility sender (CFS) 16-1. The CFS 16-1 connects to the coupling facility receiver (CFR) 17-1 in the coupling facility 9 and establishes the IS channel between the CPC 10-1 and the coupling facility 9.

The coupling facility 9 includes one or more central processing units (CPUs) 11 including CPUs 11-1, 11-2, . . . , 11-U. The coupling facility 9 includes coupling facility receiver 17-1 that connects to the IS channels 8-1 which in turn connects to a coupling facility sender (CFS) 16-1. Storage 14 includes structures 4-1, . . . , 4-S. A predetermined low address location, $CF_1$, in storage 14 stores coupling facility code (ACCC) for controlling the setup and operation of the coupling facility 9.

Figure 3:
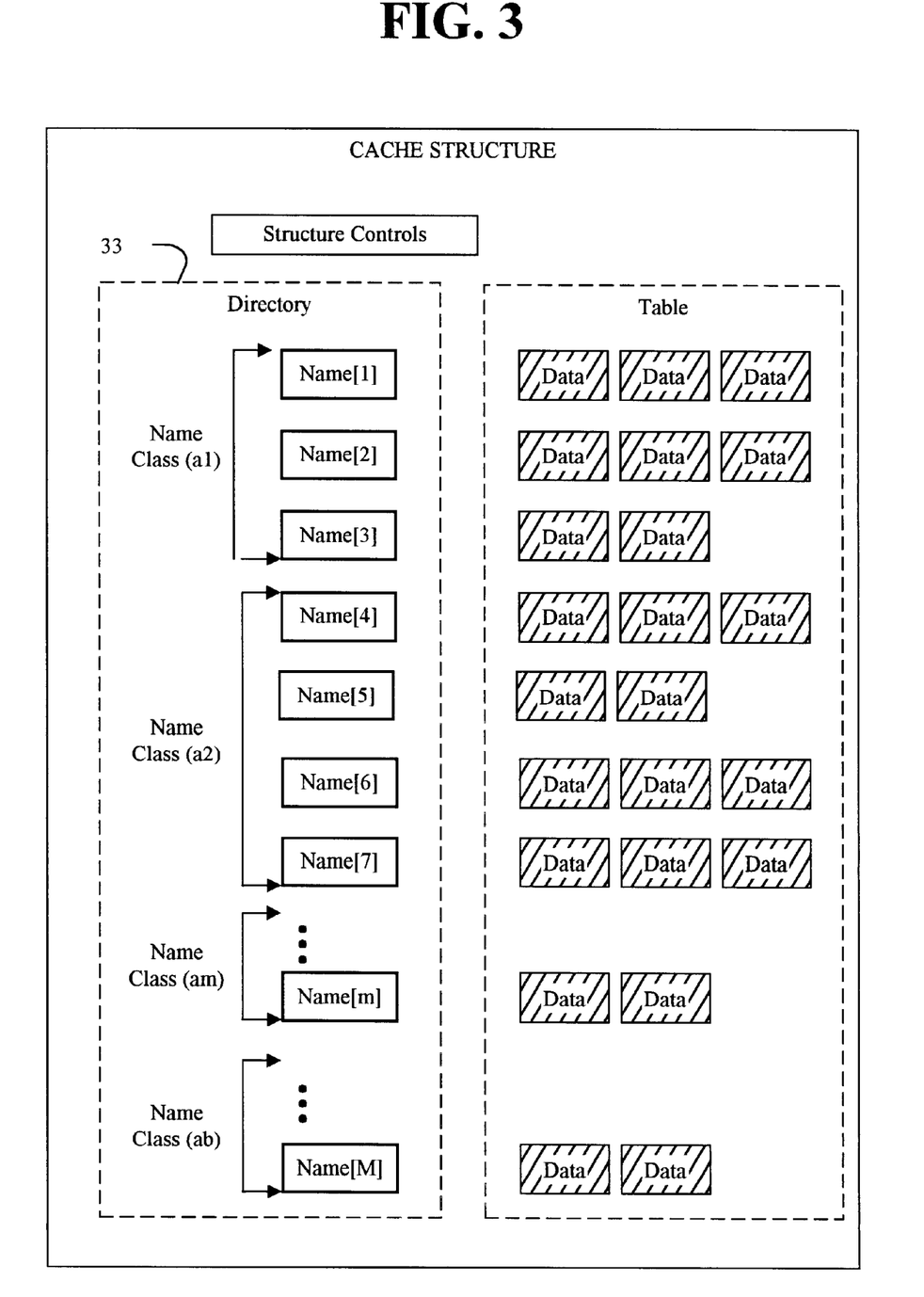
FIG. 3 depicts a block diagram representation of a cache structure in the coupling facility (CF) of FIG. 1 and FIG. 2.

Cache Structure—FIG. 3

In FIG. 3, a block diagram of a cache structure of a coupling facility 9 of FIG. 1 is shown. The cache structure of FIG. 3 is typical of one or more of the structures 4 in FIG. 2 and is like that described in U.S. Pat. Nos. 5,317,739 and 5,537,574. In the cache structure of FIG. 3, the directory 33 includes Name information and the Table includes Data information. In FIG. 3, objects are identified with the names, Name[1], . . . , Name[m], . . . , Name[M] in directory 33. The Name information allows objects to be accessed by different application programs such as the application programs APP1, . . . , APP4 in the CPC 10-1 and by other application programs in CPCs 10 in FIG. 1. The names in FIG. 3 are organized into name classes which, for purposes of illustration, are the Name Class[a1] including the names Name[1], Name[2] and Name[3], the Name Class[a2] including the names Name[4], Name[5], Name[6] and Name [7], the Name Class[am] including at least the name Name [m], and the Name Class[ab] including at least the name Names[M].

Figure 4:
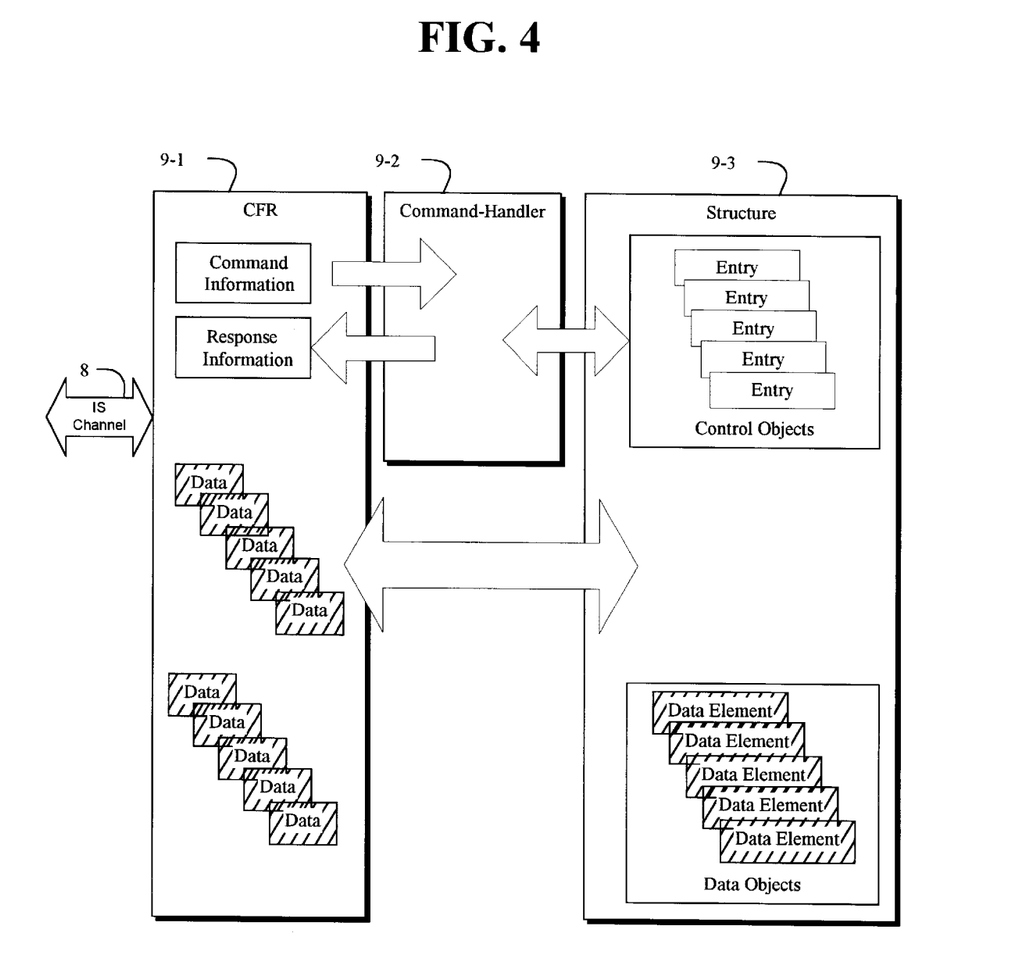
FIG. 4 depicts a block diagram representation of the processing of a direct command received by the the coupling facility (CF) from a Central Processing Complex (CPC) of FIG. 1.

Coupling Facility Operation—FIG. 4

In FIG. 4, an overview of the structure and operation of the coupling facility 9 of FIG. 1 is shown for implementing the operations described in the present application under the control of control code (ACCC). A command is input to the coupling facility from the IS links 8. A command may create, retrieve, update or delete objects within the coupling facility 9 on behalf of the attaching central processing complex (CPC) 10. Examples of commands that access a single named entry in a cache structure are: Read and Register, Write and Register, Read for Castout, Write When Registered. Examples of commands that access a set of cache entries matching the input name under the input mask condition are Invalidate Nane, Read Directory, and Invalidate Complement Copies.

The transfer of information and the execution of commands in FIG. 4 occurs when the channel facility receiver 9-1, (for example, CFR 17-1 in FIG. 1 and FIG. 2) in the coupling facility 9 passes a coupling facility command received over an IS channel 8 from the coupling facility sender (CFS) 16-1 in the CPC 10-1 to the command-handler 9-2 for processing.

The overall operation of the coupling facility 9 of FIG. 1 to carry out commands is well known in IBM, Amdahl and other systems and is generally of the nature described in detail in the systems of U.S. Pat. Nos. 5,317,739 and 5,537,574.

By way of example, assume that application APP2 in CPC 10-1 sends an IN (invalidate name) command over CFS 16-1 and CFR 17-1 to invalidate all objects in the Name Class[a2] of FIG. 3. The coupling facility code (ACCC) in order to execute that IN command searches the directory 33 to locate the names Name[4], Name[5], Name[6] and Name[7] that are in the Name Class [a2] so that those names can be invalidated. The manner in which the searching is performed is determined by the search algorithm implemented in the ACCC coupling facility code.

Search Algorithm. The search algorithm used in ACCC is based on an ordered table structure. See, for example, Algorithm T (Sequential search in ordered table) on page 396 and section 6.2, "Searching by Comparison of Keys", on page 406 in the book *The Art of Computer Programming, Vol. 3: Sorting and Searching,* Donald E. Knuth. [hereafter Knuth].

Prior to CF level 7, the establishment of an ordered table is based on a normal ordering method which after comparing two given keys $K_i$ and $K_j$, determines if $K_i<K_j$, $K_i=K_j$ or $K_i>K_j$. For purposes of this specification, an ordered table formed using this normal ordering method will be referred to as having a normal order. When the key is a name, the comparison is usually performed one alphabetic character at a time proceeding in a compare direction. In the context of the CF command architecture, the compare direction is left-to-right but other ordering directions, for example right-to-left, can be used equally well in other applications as long as the ordering is consistently employed.

The present invention provides a mask ordering method which controls the way keys are ordered and compared. The mask ordering method is used, in one preferred embodiment, in a coupling facility (CF) cache structure where each key is a 16-byte name, and the comparison is byte-wise left-to-right. The parameter used in the ordering method is the 16-bit name class mask. In a coupling facility, the name class mask is fixed in a cache structure when the structure is created. The mask represents an arbitrary user-defined naming convention where names that are identical in byte positions corresponding to bits which are on in the name class mask, belong to the same name class. For a description of name class and name class mask, see the section "Using Name Classes in a Coupling Facility" in the *Sysplex Services Guide*. The objective of a name class search is, to locate all cache entries in the same name class quickly and efficiently. Using the present invention, cache entries belonging to the same name class fall into contiguous positions when ordered by the mask ordering method.

Mask Ordering Method. The mask ordering method operates to order (with a less than, greater than or equal to comparison) any two N-byte names (Name__1 and Name__2) where Name__1 has the bytes $^1B_0, ^1B_1, \ldots, ^1B_n, \ldots, ^1B_{N-1}$ and where Name__2 has the bytes $^2B_0, ^2B_1, \ldots, ^2B_n, \ldots, ^2B_{N-1}$. The mask ordering method uses an N-bit ordering mask having the bits $b_0, b_1, \ldots, b_n, \ldots, b_{N-1}$ where the N bits in the mask correspond one for one with the N bytes in the names Name__1 and Name__2 in the same compare direction (for example, left-to-right). The mask ordering method operates as follows to order Name__1 and Name__2:

> A comparison of the two names Name__1 and Name__2 proceeds in the compare direction byte by byte for up to two passes, as necessary. In the first pass, for each byte position indicated by index n, for n=0, 1, . . . , N−1 where the corresponding mask bit $b_n$, in the string of mask bits $b_0, b_1, \ldots, b_n, \ldots, b_{N-1}$ is on (for example, $b_n=1$), byte $^1B_n$ is compared with byte $^2B_n$. In the second pass, for each byte position indicated by index n, for n=0, 1, ..., N−1 where the corresponding mask bit is off (for example, $b_n=0$), byte $^1B_n$ is compared with byte $^2B_n$. Thus, a specific compare order for any particular comparison is specified by the ordering mask and the compare direction.

The byte-by-byte comparison continues in the above compare order until the order of Name_1 relative to Name_2 is determined and processing is then terminated according to the following:

If a first not equal byte comparison occurs between corresponding bytes $^1B_n$ and $^2B_n$, in Name_1 and Name_2, respectively, then,
  If the byte $^1B_n$ in Name_1 is greater than the corresponding byte $^2B_n$, in Name_2, then Name_1 is greater than Name_2 and processing terminates with an order Name_2<Name_1;
  If the byte $^1B_n$ in Name_1 is less than the corresponding byte $^2B_n$, in Name_2, then Name_1 is less than Name_2 and processing terminates with an order Name_1<Name_2;
Else, if all corresponding N bytes of the names Name_1 and Name_2 are compared and found equal such that byte $^1B_n$ in Name_1 equals the corresponding byte $^2B_n$, in Name_2, for all of n=0, 1, ..., N−1, Name_1 is equal to Name_2 and processing terminates with an order Name_1= Name_2.

An example of an N-bit mask with bits $b_0, b_1, b_2, b_n, \ldots, b_{N-1}$ having $b_0=0, b_1=1, b_2=0, b_3=0, b_4=1, b_5=0$ and all other bits $b_6, \ldots, b_n, \ldots, b_{N-1}$ equal to 0 so that the mask is expressed as b '010010 . . . 0'. With that mask and a left-to-right compare direction, the following compare order is defined for comparing byte $^1B_n$ with byte $^2B_n$ where the bytes of Name_1 in the order $^1B_1, ^1B_4, ^1B_0, ^1B_2, ^1B_3, ^1B_5, \ldots, ^1B_{N-1}$ are compared with bytes of Name_2 in the order $^2B_1, ^2B_4, ^2B_0, ^2B_2, ^2B_3, ^2B_5, \ldots, ^2B_{N-1}$, respectively.

When applying the mask ordering method to organize name classes in a coupling facility (CF) cache structure, each 16-byte cache entry name is an N-bit key; the 16-bit name class mask fixed at the creation of the cache structure is the N-bit ordering mask. The CF command architecture dictates that the compare direction be left-to-right.

By ordering cache entries using the above mask ordering method, those entries belonging to the same name class fall into contiguous positions. Furthermore, within a name class, entries are ordered by those name bytes corresponding to name-class-mask bits that are zeros. Name classes are ordered by those name bytes corresponding to name-class-mask bits that are ones.

When the name class mask is either all zeros or consists of ones in the leftmost positions with no intervening zeros, the mask ordering method produces the same order that is produced by the normal ordering method.

Example. As an example to illustrate the mask ordering method, consider the cache structure with the following set of name entries:
  AABA, ABAA, ABAB, BAAA, BABA, BBAB.
When ordered with the mask ordering method and a name class mask of b'0110', the name order is:
  BAAA<AABA<BABA<ABAA<ABAB<BBAB
When ordered with a name class mask of b'0100', the name order is:
  AABA<BAAA<BABA<ABAA<ABAB<BBAB The masked bytes are underscored. The name classes are shown in plain, italic and bold text.

A literal implementation of the mask ordering method permits a jump from one name byte to a non-contiguous name byte when the name class mask contains zero bits to the left of bits that are ones. However, on S/390 and similar systems where it is normally more efficient to compare the name bytes in a continuous left-to-right order, a preferred embodiment of the mask ordering method is to pre-arrange the name bytes left-to-right in the compare order based on the name class mask. This pre-arrangement allows a more efficient name comparison operation to be performed. This pre-arrangement technique is sometimes hereafter referred to as name scrambling. The reverse procedure of returning a scrambled name to its original order is referred to as unscrambling.

Scrambling Example. The scrambling method using the example above where the name class mask is "b'0110'=" results in the following ordered list of scrambled names:
  AABA<ABAA<ABBA<BAAA<BAAB<BABB
The above scrambled names are derived from the unscrambled names as follows:
  AABA, ABAA, ABAB, BAAA, BABA, BBAB.
In the example, bytes 0, 1, and 2 of each unscrambled name are moved to bytes 2, 0, and 1 of the scrambled name, respectively. Notice that all masked bytes are now at the leftmost positions and name comparisons are performed in a pure left-to-right order.

The use of scrambled names often provides a performance gain. For each table entry name search, insertion or deletion operation, there are generally many comparison operations versus one scrambling operation for the input name to be searched, inserted or deleted. In the worst case, the number of comparison operations equals $\log_2 M$ where M equals the number of entries in the table. If the cost (usually measured in time) of the scrambling plus the cost of multiple more-efficient comparisons is less than the cost of multiple less-efficient comparisons, then the scrambling technique can result in a performance gain.

For performance gain, the following implementation alternative is described. Given an input name for insertion, deletion or matching, the scrambling is performed and the more efficient name comparison operation is performed during a search. For an insertion, the name scrambled at the beginning of the search is placed in the newly created cache entry (i.e., no additional scrambling is needed).

In some embodiments, names are stored in a scrambled form and then unscrambled when retrieved by an application. In some long-running asynchronous commands, a group of cache entry names are returned. In the scrambling embodiment where only the scrambled names are stored, each returned name needs to be unscrambled. However, the performance impact of unscrambling for such asynchronous commands is generally insignificant.

In some embodiments, names are stored both in a scrambled form and in an unscrambled form so that when retrieved by an application no unscrambling is required. Such an embodiment requires a greater amount of storage.

Name scrambling and unscrambling can be bypassed if the name class mask is all zeros or consists of ones in the leftmost positions with no intervening zeros. In these cases, the name comparison is already in the (more efficient) continuous left-to-right order. Such name class masks are hereafter referred to as naturally-ordered masks and are detected during structure creation time. Since the name class mask is fixed, a flag is set when a naturally-ordered mask is detected to facilitate bypassing of subsequent scrambling and unscrambling operations.

Mask Ordering Method For Tree Cache Structure. Some systems such as those from Amdahl Corporation utilize a normally ordered binary tree structure to implement an ordered list of cache name entries. A tree structure is one embodiment of a table that can employ a normal ordering method as previously described or can employ the mask ordering method. A tree structure makes it possible to insert and delete entries quickly and to search the cache directory efficiently. For a general discussion of normally ordered binary tree searching, see Section 6.2.2 "Binary Tree Searching" in Kruth. By employing the mask ordering method instead of the normal ordering method during tree entry search, insertion and deletion operations, the binary tree represents a list of cache name entries having a modified mask order that exhibits name class affinity. The ordering is controlled by the fixed cache structure name class mask and is hereafter referred to as a mask order.

A tree structure having a mask order of entries, controlled by the mask ordering method, does not incur more comparisons or unnecessary operations than the normal ordering method when searching, inserting or deleting a tree entry. The tree structure as controlled by the mask ordering method greatly facilitates those commands that process a name class at a time.

Since the same binary tree is used, with no additional data field, to support the mask ordering with name class affinity, no additional storage overhead is incurred for a mask ordered tree as compared to a normally ordered tree.

Basic Name Class Scan

A name class scan is a model-dependent optimization that is available in coupling facilities for S/390 after IBM provided CF level 7 and is used for commands that process all cache entries whose name matches the input name under the input mask condition. The optimization eliminates the overhead of scanning the entire cache directory by taking advantage of any name class affinity that is available. The optimization is achieved in the present application using the mask ordering method with tree entries using the following scan algorithm.

Scan Algorithm. In the basic embodiment, a command specifies an input name mask equal to the fixed cache structure name class mask; that is, one whole name class of cache entries is to be processed. This processing is performed by first locating the lowest entry among all entries satisfying the input mask and following with a contiguous scan.

Find Lowest Entry. The lowest entry is found by constructing a name based on the input name with all bytes corresponding to zero bits in the input name mask set to zeros. Note that in a general description of this algorithm, this input name mask is not necessarily equal to the name class mask used in the mask ordering method. The distinction between the input name mask and the name class mask is critical in the additional optimization cases that follow. The standard binary tree search algorithm, employing the aforementioned mask ordering method locates the lowest name that matches the input name under the mask condition. This operation takes in the order of $\log_2 N$ comparisons where N is the total number of assigned cached entries.

Contiguous Scan. After finding the lowest entry, the entries are scanned in the low-to-high order through the ordered list which in Amdahl systems is implemented as a binary tree. Each name (including the first) is checked. If the name matches the input name under the input name mask condition, the entry is processed. If the name does not match, the entries satisfying the input name mask are exhausted and the scan terminates. Since the modified entry order exhibits name class affinity, no entries will be scanned unnecessarily except the last entry.

Example. Consider a name class mask of b'0110' and the following ordered list:

BAAA<AABA<BABA<ABAA<ABAB<BBAB

A command specifying an input name BBAB and an input mask of b'0110' results in the construction of a search name ABAA. A binary search in the order of $\log_2 6$ comparisons should find the lowest entry. A contiguous scan of three entries will result in the entire name class (ABAA, ABAB, BBAB) being processed.

Additional Optimizations

When the name scrambling method is implemented, the input mask or the name class mask or both need to be scrambled also to match the scrambled names. The above "Find Lowest Entry" and "Contiguous Scan" algorithms are then applied to the scrambled names and masks. Briefly, "Find Lowest Entry" consists of scrambling the input name and mask, zeroing the scrambled input name bytes where the scrambled input mask bits are zeros, and searching the tree using the more efficient left-to-right name comparison. Similarly, "Contiguous Scan" consists of matching each scrambled name in the ordered list with the scrambled input name under the scrambled input mask. A scrambled input mask is only needed during the contiguous scan operation when it is used to select a correct subset of (already scrambled) name bytes for comparison. Similarly, a scrambled name class mask is only needed during the modified scan operation in the superset case (see later) when it is used to select a correct subset of (already scrambled) name bytes for comparison. The name class mask can be scrambled once and saved and will look like a naturally-ordered mask. So if the input mask is identical to the name class mask (as in the basic name class scan case), the saved scrambled name class mask can be used instead.

When a mask is scrambled, the 16 bits in a scrambled mask correspond to the bytes in the scrambled name in the same way as those bits in the original mask correspond to the original name. If the scrambling of a name is described by a function j=K(i) which maps byte position i of the original name to byte position j of the scrambled name, then this same function is applied to an unscrambled mask bit position i to produce a scrambled mask bit position j.

In existing level 7 IBM CFCC implementations, name class queues are used to group together entries belonging to the same name class. When entries of a specific name class are to be deleted, CFCC scans through the name class queue and deletes all entries encountered, without having to scan any entries not belonging to the specified name class. However, since entries within a name class queue are not necessarily maintained in alphabetical order, scanning a subset of a name class cannot be as efficient as the leftmost subset optimization described in this specification. Furthermore, when an input name mask requires scanning multiple name classes, the discrete name class queues may not be the best vehicle to support it. Presumably, for these reasons, the current CFCC implementation requires that the input mask must equal the name class mask for the basic optimization to take place; otherwise, the entire cache directory is scanned.

In addition to the optimization provided through the basic name class scan, scans for certain input name masks that are different from the fixed cache structure name class mask can also be optimized. Such name masks are categorized as Leftmost Subset Leftmost Superset and Superset. When the input name mask does not fall into one of the above categories, further optimization is not generally applicable and hence, scanning the entire cache directory is necessary.

Leftmost Subset. An input name mask is a leftmost subset of the cache structure's fixed name class mask when the following is true:

1. No bit is on in the name mask which is off in the name class mask.
2. If any bit is off in the name mask which is on in the name class mask, it is not followed by (in left-to-right order) a bit which is on in both masks.

For example, if the name class mask is b'01101010 ... 0', then the following name masks are leftmost subsets of the name class mask: b'01101000 ... 0', b'01100000 ... 0' and b'01000000 ... 0'. However, the following name masks are not leftmost subsets of the name class mask: b'01100010 ... 0', b'01000010 ... .0' and b'11000000 ... 0'.

Entries satisfying name masks that are leftmost subsets of the name class mask will appear as concatenations of contiguous name classes. Thus an efficient scan may be implemented using the same algorithm as for the basic name class scan.

Example. Consider a name class mask of b'0110' and the following ordered list:

B<u>AAA</u><A<u>ABA</u><B<u>ABA</u><A<u>BAA</u><A<u>BAB</u><B<u>BAB</u>

Consider an input name BABB and an input mask of b'0100'. This name mask is a leftmost subset. Applying the algorithm, the search name is AAAA and the lowest entry found is BAAA. A contiguous scan of three entries will result in two entire name classes (BAAA, AABA, BABA) being processed. Note that the contiguous scanning algorithm does not need or care to know whether it has moved from one name class to another; it stops automatically when an entry is found which does not match the input name under the input mask or the end of the ordered list is reached.

The leftmost subset case may be useful in the following situation: Suppose each database has many tables and each table has many pages. A cache entry represents a page and is named in the format: (A, X, i), representing database A table X page i. A database application might have defined a name class mask selecting the database (A) and table (X) name fields because, say, it wants to efficiently remove all entries belonging to table X (of database A) when it is closed. The leftmost subset enhancement in the present invention allows all database A entries to be also efficiently deleted when the database is closed (by specifying an input name mask that selects the database A name field only).

Leftmost Superset. An input name mask is a leftmost superset of the name class mask when the following is true:

1. All bits on in the name class mask are also on in the name mask.
2. If a bit is on in the name mask but off in the name class mask, it is not preceded by (in left-to-right order) any bits that are off in both masks.

For example, if the name class mask is b'01101010 ... 0', then the following name masks are leftmost supersets of the name class mask: b'11101010 ... 0', b'11111010 ... 0' and b'1111111110 ... 0'. However, the following name masks are not leftmost supersets of the name class mask: b'01111010 ... 0', b'01101110 ... 0'and b'01111110 ... 0'.

Entries satisfying name masks that are leftmost supersets of the name class mask form a subgroup of contiguous entries within a name class. Thus an efficient scan may be implemented using the same algorithm as for the basic name class scan.

Example. Consider a name class mask of b'0110' and the following ordered list:

B<u>AAA</u><A<u>ABA</u><B<u>ABA</u><A<u>BAA</u><A<u>BAB</u><B<u>BAB</u>

Consider an input name ABAB and an input mask of b'1110'. This name mask is a leftmost superset. Applying the algorithm, the search name is ABAA and the lowest entry found is ABAA. A contiguous scan of two entries will result in a subgroup of the name class (ABAA, ABAB) being processed. Note that the contiguous scanning algorithm does not necessarily scan to the end of the name class; it just stops automatically when an entry is found which does not match the input name under the input mask or the end of the ordered list is reached.

The leftmost superset case may be useful in the following situation: Suppose each database has many tables. Suppose the tables are partitioned so each table has many partitions and each partition has many pages. A cache entry represents a page and is therefore named in the format: (A, X, P, i), representing database A table X partition P page i. A database application might have defined a name class mask selecting the database (A) and table (X) name fields because, say, it wants to efficiently remove all entries belonging to table X (of database A) when it is closed. The leftmost superset enhancement in the present invention allows all partition P's entries be also efficiently deleted when the table partition is closed (by specifying an input name mask that selects the (A, X, P) name fields).

Superset. An input name mask is defined as a superset of the name class mask when the following is true:

1. All bits on in the name class mask are also on in the name mask.
2. A bit that is off in both masks is followed by (in left-to-right order) one or more bits that are on in the name mask but off in the name class mask.

For example, if the name class mask is b'01101010 ... 0', then the following name masks are leftmost supersets of the name class mask: b'01111010 ... 0', b'01101110 ... 0' and b'11101011 ... 0'. Note that name masks that are leftmost superset are not considered as a superset since a more efficient scanning algorithm can be employed.

Entries satisfying name masks that are supersets of the name class mask appear as discontinuous subgroups within a name class. They may be scanned as follows:

Perform the Find Lowest Entry step disclosed in the basic name class scan algorithm. Then scan the ordered list of entries in the low-to-high order, until the current entry no longer matches the input name under the name class mask condition (not the input mask). For each name scanned, match it with the input name under the input mask condition (not the name class mask). If it matches, the entry is further processed as required by the command.

This algorithm is more expensive than the basic name class scan as it involves two calls to the match function during the forward scan, and scans more entries than it needs to, but the scan is limited to the name class designated by the input name and the fixed name class mask and thus avoids scanning the entire cache directory.

Example. Consider a name class mask of b'0110' and the following ordered list:

B<u>AAA</u><A<u>ABA</u><B<u>ABA</u><A<u>BAA</u><A<u>BAB</u><B<u>BAB</u>

Consider an input name ABAB and an input mask of b'0111'. This name mask is a superset (but not leftmost). Applying the algorithm, the search name is ABAB and the lowest entry found is ABAB. A contiguous scan of two entries will result in two sub groups with a single entry each (ABAB, BBAB) being processed.

The superset case may be useful in the same situations as the leftmost superset case but maybe the naming convention caused the name to be in the format (i, A, X, P).

In the superset case, when the name scrambling technique is implemented, the input name and mask also need to be scrambled as in the other cases. Briefly, the modified scan consists of matching each scrambled name in the ordered list with the scrambled input name under the scrambled input mask until the scrambled name of the current entry no longer matches the scrambled input name under the scrambled name class mask.

Note also that when applying the rules to determine the relationship between an input mask and the name class mask (subset, superset, etc.), the two masks must be in the same state: either both scrambled or both unscrambled.

While the invention has been particularly shown and described with reference to preferred embodiments thereof it will be understood by those skilled in the art that various changes in form and details may be made therein without departing from the scope of the invention.

What is claimed is:

1. A method of ordering a first N-byte key, Key_1, relative to a second N-byte key, Key_2, using an N-bit ordering mask where each mask bit in the ordering mask is on or off and where N bits in the ordering mask correspond one for one with N bytes in each of Key_1 and Key_2 comprising:

comparing Key_1 and Key_2, byte-by-byte in a compare direction with a compare order determined first by bytes where a corresponding mask bit is on and then by bytes where a corresponding mask bit is off, continuing said byte-by-byte comparing until a less than, greater than or equal to order of Key_1 relative to Key_2 is determined.

2. The method of claim 1 wherein in said comparing step,
   if a first not equal byte comparison occurs between corresponding bytes in Name_1 and Name_2, then,
      if the corresponding byte in Name_1 is greater than the corresponding byte in Name_2, then Name_1 is greater than Name_2 and the order is Name_2<Name_1;
      if the corresponding byte in Name_1 is less than the corresponding byte in Name_2, then Name_1 is less than Name_2 and the order is order Name_1<Name_2;
   else if all corresponding N bytes of Name_1 and Name_2 are equal, Name_1 is equal to Name_2 and the order is Name_1=Name_2.

3. A method of storing objects in a table at locations determined by N-byte names stored in a directory comprising:

ordering said names such that for each name, Name_1, paired with each other name, Name_2, Name_1 is ordered as less than, greater than or equal to Name_2 using an N-bit name class mask,
   where each bit in the name class mask is on or off and where N bits in the name class mask correspond one for one with N bytes in each of Name_1 and Name_2 in a compare direction,
   where a byte-by-byte comparison of Name_1 and Name_2 in the compare direction has a compare order that is first for bytes where the corresponding mask bit is on and second for bytes where the corresponding mask bit is off,
   where in the byte-by-byte comparison,
      if a first not equal byte comparison occurs between corresponding bytes in Name_1 and Name_2, then,
         if the corresponding byte in Name_1 is greater than the corresponding byte in Name_2 then Name_1 is greater than Name_2 and the order is Name_2<Name_1;
         if the corresponding byte in Name_1 is less than the corresponding byte in Name_2, then Name_1 is less than Name_2 and the order is order Name_1<Name_2;
      else if all corresponding N bytes of Name_1 and Name_2 are equal, Name_1 is equal to Name_2 and the order is Name_1=Name_2.

4. The method of claim 3 wherein the N-bytes in names are stored in the table scrambled in the compare direction in the compare order determined by the name class mask.

5. The method of claim 4 wherein names are retrieved from the table and the N-bytes in names are unscrambled using the compare order determined by the name class mask.

6. The method of claim 3 wherein the N-bytes in names are stored in the table scrambled in the compare direction in the compare order determined by the name class mask and wherein the N-bytes in names are also stored in the table unscrambled.

7. The method of claim 6 wherein the N-bytes in names are retrieved from the table unscrambled.

8. The table of claim 3 wherein the N-bytes in names are stored scrambled in the compare direction in the compare order determined by the name class mask except when the bits in the name class mask in the compare direction are all off or are in a string of bits all on with no intervening bit that is off.

9. The method of claim 3 wherein said table is a tree structure.

10. The method of claim 3 further including performing a name class scan for names in the directory that match an input name under an input mask.

11. The method of claim 10 wherein the name class scan is performed by,
    locating the lowest entry among all names satisfying the input mask by searching the directory with a constructed name based on the input name with all bytes corresponding to off bits in the input name mask off,
    starting with the lowest entry, scanning in the low-to-high order through the names in the directory and selecting each name that matches the constructed name.

12. The method of claim 11 wherein if the input mask is identical to the name class mask, the name class mask is scrambled in a superset selection of a subset of scrambled name bytes for comparison.

13. The method of claim 11 wherein if the input mask is identical to the name class mask, the name class mask is scrambled and saved and appears as a naturally-ordered mask.

14. The method of claim 11 wherein if the input mask is identical to the name class mask, the input mask is scrambled by a function K which maps bit position i of the original name class mask to bit position j of the scrambled name class mask and applying K to the input mask to produce the scrambled input mask.

15. The method of claim 10 wherein if the input mask is identical to the name class mask, the scan scrambles the name class mask and the input mask and sets to off the scrambled input name bytes where the scrambled input mask bits are off and searches the tree using a normal comparison.

16. The method of claim 15 wherein a contiguous scan matches each scrambled name with the scrambled input name under the scrambled input mask.

17. The method of claim 1 wherein if the input mask is identical to the name class mask, the input name mask is a leftmost subset of a fixed name class mask if no bit is on in the name mask which is off in the name class mask and if any bit is off in the name mask which is on in the name class mask is not followed in the compare direction by a bit which is on in both the name class mask and the name mask.

18. A method of storing objects in a cache having one or more data bases identified by an A name field, each database having a plurality of tables identified by an X name field, where each table has a plurality of pages identified by an i name field, i, and where N-byte names field a directory identifying pages in the cache are in the format (A, X, i) comprising:

ordering said names such that for each name, Name_1, paired with each other name, Name_2, Name_1 is ordered as less than, greater than or equal to Name_2 using an N-bit name class mask,
where each bit in the name class mask is on or off and where N bits in the name class mask correspond one for one with N bytes in each of Name_1 and Name_2 in a compare direction,
where a byte-by-byte comparison of Name_1 and Name_2 in the compare direction has a compare order that is first for bytes where the corresponding mask bit is on and second for bytes where the corresponding mask bit is off,
where in the byte-by-byte comparison,
if a first not equal byte comparison occurs between corresponding bytes in Name_1 and Name_2, then,
if the corresponding byte in Name_1 is greater than the corresponding byte in Name_2, then Name_1 is greater than Name_2 and the order is Name_2<Name_1;
if the corresponding byte in Name_1 is less than the corresponding byte in Name_2, then Name_1 is less than Name_2 and the order is order Name_1<Name_2;
else if all corresponding N bytes of Name_1 and Name_2 are equal, Name_1 is equal to Name_2 and the order is Name_1=Name_2.

19. The method of claim 18 including the step of using a a name class mask selecting the A name field and the X name field to select all entries belonging to table X of database A.

20. The method of claim 18 including the step of using a a name class mask selecting the A name field to select all entries belonging to database A.

21. The method of claim 18 wherein the input mask is selected identical to the name class mask and the lowest entry is found and a contiguous scan is performed.

22. The method of claim 18 wherein one or more of said tables is partitioned so each table has a plurality of partitions identified by a P name field and each partition has a plurality of said pages whereby a name has a format: (A, X, P, i), representing database A, table X, partition P and page i.

23. The method of claim 22 including the step of using a a name class mask selecting the A name field, the X name field and the P name field to select all entries belonging to partition P, table X, of database A.

* * * * *